(12) United States Patent
Kosaka (10) Patent No.: US 7,797,349 B2
(45) Date of Patent: Sep. 14, 2010

(54) DEVICE USER INTERFACE XML STRING TABLE MANAGER

(75) Inventor: Naohiko Kosaka, Concord, CA (US)

(73) Assignees: Kyocera Mita Corporation, Osaka-shi (JP); Kyocera Technology Development, Inc., Concord (JP)

( * ) Notice: Subject to any disclaimer, the term of this patent is extended or adjusted under 35 U.S.C. 154(b) by 414 days.

(21) Appl. No.: 11/714,469

(22) Filed: Mar. 6, 2007

(65) Prior Publication Data

US 2008/0222190 A1 Sep. 11, 2008

(51) Int. Cl.
*G06F 17/30* (2006.01)

(52) U.S. Cl. ............... 707/802; 707/805; 707/803; 707/783; 707/781

(58) Field of Classification Search .......... 707/3, 707/100, 790, 802, 805, 791, 781, 783, 803
See application file for complete search history.

(56) References Cited

U.S. PATENT DOCUMENTS

| | | | |
|---|---|---|---|
| 5,499,335 A | 3/1996 | Silver | |
| 6,205,418 B1 | 3/2001 | Li | |
| 6,252,589 B1 | 6/2001 | Rettig | |
| RE37,722 E * | 5/2002 | Burnard et al. ................. | 713/1 |
| 6,563,522 B1 | 5/2003 | Rosen | |
| 6,683,632 B2 | 1/2004 | Newman | |
| 6,868,528 B2 | 3/2005 | Roberts | |
| 7,290,208 B2 * | 10/2007 | Saborowski et al. ......... | 715/234 |
| 7,299,410 B2 * | 11/2007 | Kays et al. ................... | 715/234 |
| 2003/0182632 A1 | 9/2003 | Murdock | |
| 2005/0066315 A1 * | 3/2005 | Nguyen et al. ............... | 717/136 |
| 2006/0004738 A1 * | 1/2006 | Blackwell et al. .............. | 707/4 |
| 2006/0077442 A1 | 4/2006 | Lum | |
| 2006/0116864 A1 * | 6/2006 | McHugh et al. ................. | 704/2 |
| 2006/0195831 A1 | 8/2006 | Bossom | |
| 2007/0061345 A1 * | 3/2007 | Thompson et al. .......... | 707/100 |

* cited by examiner

*Primary Examiner*—Mohammad Ali
*Assistant Examiner*—Thuy (Tiffany) Bui

(57) ABSTRACT

A method for managing a user interface (UI) string table, comprising placing a UI string table at a string table management unit; administrator(s) editing the UI string table through an administrator interface of a UI string table manager; and read-only users (ROUs) accessing the UI string table through a ROU interface of the UI string table manager.

The XML-formatted string table manager tool for printers and other devices is used by administrators to maintain the string table and by software and QA engineers to access it, possibly remotely. The result is a more efficient localization process, by eliminating the manual sharing and merging of multiple string tables by the localization team.

Methods also include hierarchical organization into top, language, tab, dialog, and string levels; optional string ID number; add, edit, remove, search features; automatic selection and insertion of hotkey character for a new English and Asian language string; and a string table server to which local copies are synchronized.

16 Claims, 5 Drawing Sheets

```
<language lang="English">
  <tab name="Basic" id="6000" parent="None"
       child="basic, Paper Sizes, Mailbox">basic
    <dialog name="basic" id="6000" parent="Basic" child="None">
      <string id="6100" control="text" hotkey="P">Paper
      </string>
      <string id="6111" control="checkbox" hotkey="P">Portrait
      </string>
      <string id="6104" control="button" hotkey="S">Paper Sizes
      </string>
    </dialog>
    <dialog ="Paper Sizes" parent="Basic" child="None">
      <string id="6123" control="button" hotkey="A">Add
      </string>
    </dialog>
    <dialog ="Mailbox" parent="Basic" child="None">
      <string id="6124" control="text" hotkey="M">Mailbox
      </string>
    </dialog>
  </tab>
  <tab name="layout" parent="None" child="">
  ...
  </tab>
</language>
```

| 510 | For Non-Asian languages:<br>Check if hotkey is necessary for the new string. (If the control is checkbox, radio button, or push button, then the hotkey is necessary.) |
|---|---|

| 520 | If hotkey is necessary, determine the language for the new string. |
|---|---|

| 530 | Traverse current strings used in the dialog where new string will be inserted, and save the hotkeys used in those strings. |
|---|---|

| 540 | Compare the saved hotkeys and each character in the new string. |
|---|---|

| 550 | Pick a character from the new string that is not in saved hotkeys. |
|---|---|

| 560 | Add the chosen character as a hotkey. |
|---|---|

| 570 | For Asian languages:<br>Go to the English string table and search the string by string ID. |
|---|---|

| 580 | If hotkey is available in English string, save that hotkey character. |
|---|---|

| 590 | Copy the saved hotkey character to the new Asian string. |
|---|---|

FIG. 5

DEVICE USER INTERFACE XML STRING TABLE MANAGER

FIELD OF THE INVENTION

This invention relates to device user interface, and more particularly to methods of managing device user interface using XML string table manager.

BACKGROUND OF THE INVENTION

In the course of developing a new system to be used in multiple nations and multiple languages, tremendous amount of adjustment, localization, and internationalization of the strings and other aspects of user interface (UI) are required. Traditionally the strings or string tables were maintained in a text format, and this involved sharing and merging of multiple string tables by the members of the localization team. A need to make the localization process more efficient has been acutely felt. The present invention arose out of the above perceived needs and concerns associated with methods of managing and localizing device UI string tables, and presents efficient methods of managing device user interface using an XML string table manager.

SUMMARY OF THE INVENTION

Methods, computer program products, computing and printing systems for managing device user interface, and more particularly to managing device user interface using XML string table, are described. A preferred embodiment of the present invention proposes an application or tool which manages XML formatted string tables used for graphical user interface of the printer driver. A management system may be a web based application which contains features used by Software and QA (Quality Assurance) Engineers. Proposed methods of managing UI strings include, adding, removing, editing, searching strings, as well automatically insert/verify hotkeys for all languages supported by the driver. An XML based string table is kept at the server to enable easy maintenance and network access. These features will greatly enhance the localization process by keeping the string table to a manageable state and eliminate the steps required, such as sharing and merging string tables, by the localization team.

In typical, existing methodologies, string tables used for localization are kept in a text file format. The developer responsible for managing strings needs to manually edit the text file when adding, editing, removing strings, and inserting hotkey for each string for all supported languages. With a String XML Manager of the present invention, the developer will no longer need to manually and directly edit strings in the text file. The supported graphical user interface enables the developer to easily maintain without understanding the internal XML architecture of the string table. This GUI is available through a network, so QA engineer as well as product engineers who are testing localization will be able to remotely access the latest string table right after the modification done by the localization engineer. This feature will eliminate the unnecessary waiting for the engineer to send the whole text file formatted string table. The remote access to the string table through GUI is very essential when the localization testing is done offsite.

The invention will be more fully understood upon consideration of the detailed description below, taken together with the accompanying drawings.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
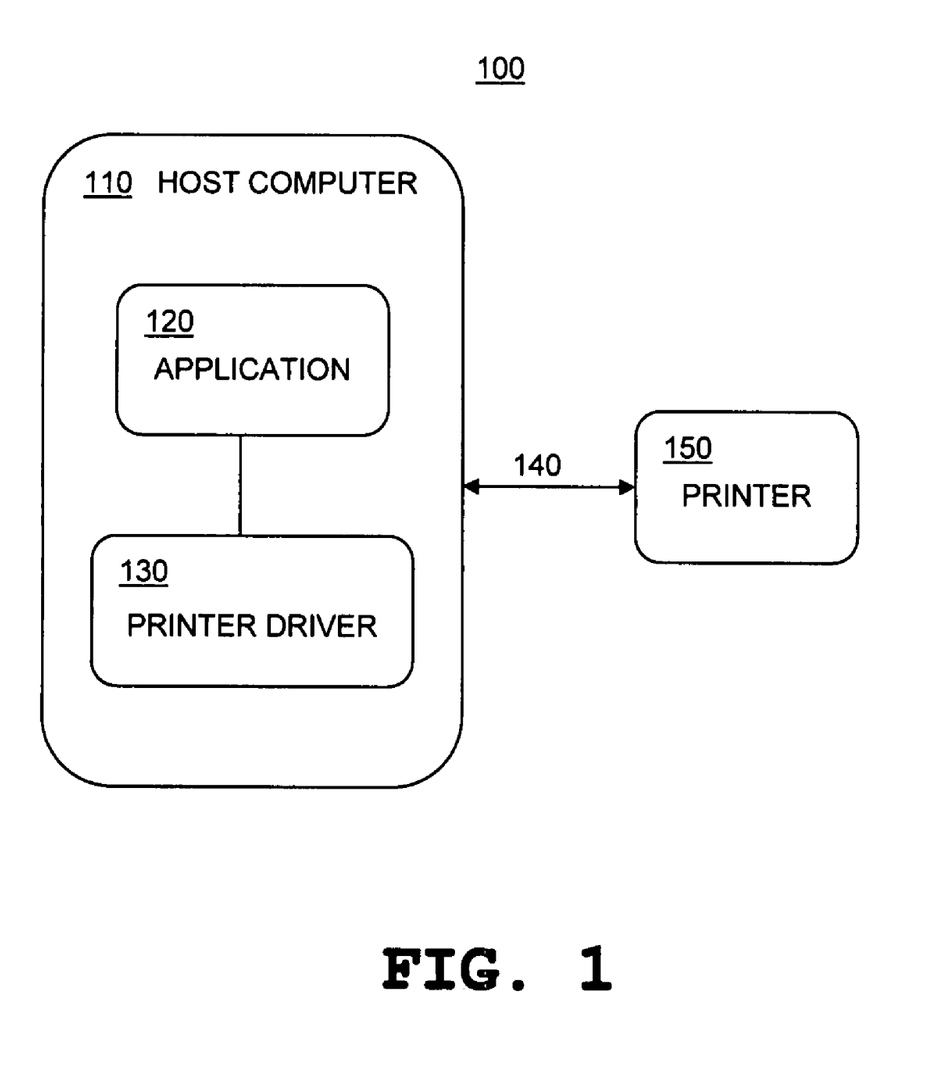
FIG. 1 is a simplified block diagram showing connection of a computing system to a printer, in accordance with a preferred embodiment of the present invention.

FIG. 1 is a simplified block diagram showing connection of a computing system to a printer, in accordance with a preferred embodiment of the present invention. FIG. 1 shows a general printing system setup 100 that includes a host computer 110 and a printer 150. Here, the printer 150 may be any device that can act as a printer, e.g. an inkjet printer, a laser printer, a photo printer, or an MFP (Multifunction Peripheral or Multi-Functional Peripheral) that may incorporate additional functions such as faxing, facsimile transmission, scanning, and copying.

The host computer 110 includes an application 120 and a printer driver 130. The application 120 refers to any computer program that is capable of issuing any type of request, either directly or indirectly, to print information. Examples of an application include, but are not limited to, commonly used programs such as word processors, spreadsheets, browsers and imaging programs. Since the invention is not platform or machine specific, other examples of application 120 include any program written for any device, including personal computers, network appliance, handheld computer, personal digital assistant, handheld or multimedia devices that is capable of printing.

The printer driver 130 is a software interfacing with the application 120 and the printer 150. Printer drivers are generally known. They enable a processor, such as a personal computer, to configure an output data from an application that will be recognized and acted upon by a connected printer. The output data stream implements necessary synchronizing actions required to enable interaction between the processor and the connected printer. For a processor, such as a personal computer, to operate correctly, it requires an operating system such as DOS (Disk Operating System) Windows, Unix, Linux, Palm OS, or Apple OS.

A printer I/O (Input/Output) interface connection 140 is provided and permits host computer 110 to communicate with a printer 150. Printer 150 is configured to receive print commands from the host computer and, responsive thereto, render a printed media. Various exemplary printers include laser printers that are sold by the assignee of this invention. The connection 140 from the host computer 110 to the printer 150 may be a traditional printer cable through a parallel interface connection or any other method of connecting a computer to a printer used in the art, e.g., a serial interface connection, a remote network connection, a wireless connection, or an infrared connection. The varieties of processors, printing systems, and connection between them are well known.

The present invention is suited for printer drivers, and it is also suited for other device drivers. The above explanations regarding FIG. 1 used a printer driver rather than a general device driver for concreteness of the explanations, but they also apply to other device drivers. Similarly, the following descriptions of the preferred embodiments generally use examples pertaining to printer driver, but they are to be understood as similarly applicable to other kinds of device drivers.

Figure 2:
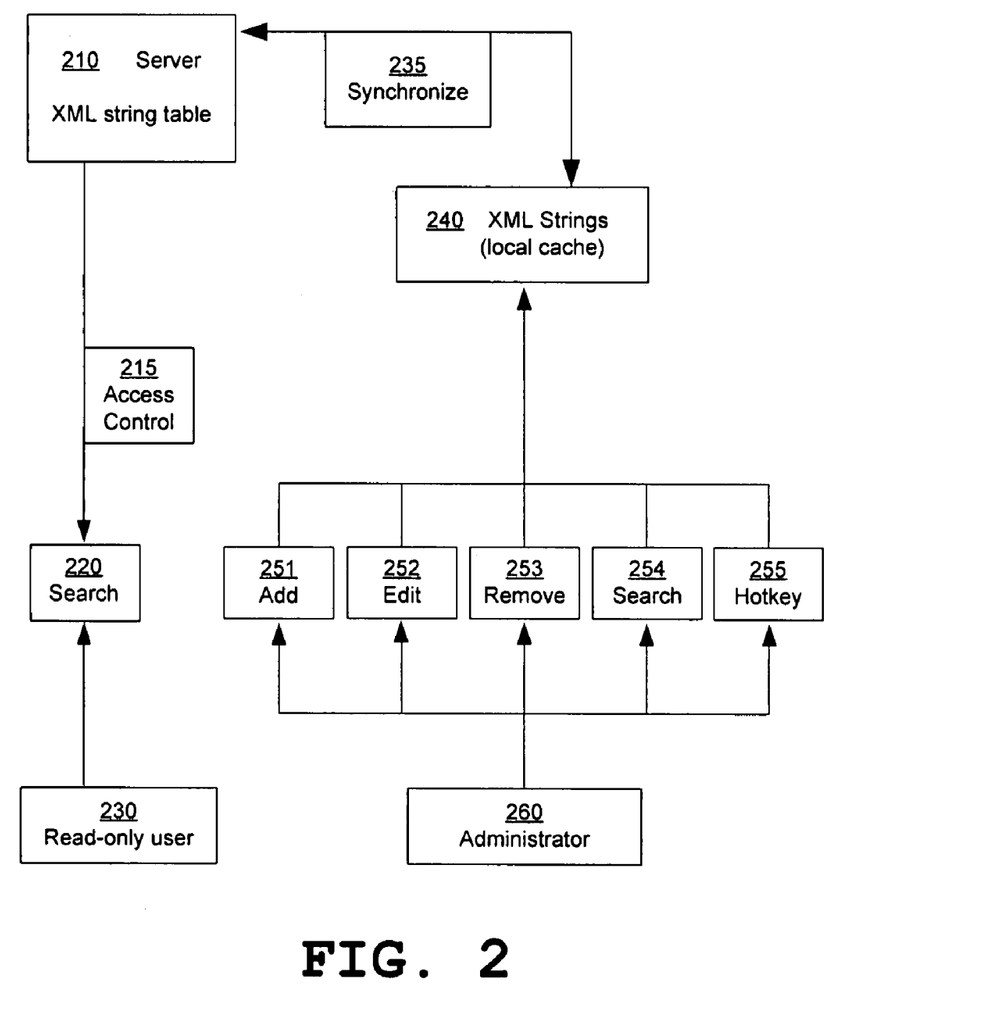
FIG. 2 is a block diagram showing the overall architecture of administrator and read-only users accessing the XML string table server, in accordance with a preferred embodiment of the present invention.

FIG. 2 is a block diagram showing the overall architecture of administrator and read-only users accessing the XML string table server, in accordance with a preferred embodiment of the present invention.

The XML string table is kept at a string table server 210, the administrator 260 manages and modifies the string table through an administrator interface of the UI string table manager, whereas a read-only user 230 has only a read-only access. Such an access may include a searching function 220, but other privileged accesses are prohibited and controlled 215 by the read-only user (ROU) interface of the UI string table manager. A read-only user 230 is typically a developer or programmer using the strings to construct and design the UI for a device.

The accesses by the administrator 260 may involve modifications to the local cache copy of the string table 240, in which case, when the string table is modified, it will be copied and synchronized 235 to the server. After the modification, the regular user (ROU) will be able to browse the newly added or modified string tables for testing localization.

The user will be able to add 251 a new string to the XML string table using a provided graphical user interface. When adding a string, a string ID, string name, parent name, child name and an optional hotkey will need to be specified.

The Add feature 251 of the present invention is used to add a string to the existing string table. It may optionally involve automatically inserting a hotkey.

A string ID is a unique ID number that represents a newly added string. This number cannot be same with other strings throughout the string table, since this ID will be used by the printer driver to display a string in the driver UI. The actual string name is the text or string that is to be added. A parent name is the name of the parent element for this string. A child name is the name of the child element. A parent and child value will be used to determine the location of the string. If the newly added string needs a hotkey, then this application will generate a hotkey automatically be comparing hotkeys within a same dialog, or user can add the hotkey manually. When the above information is entered, the XML manager automatically inserts the string into the correct position in the XML specified by the parent and child values.

Since English is the base language in an embodiment of the invention, the XML structure will only built when adding English strings and only one string can be added at one time for the English language. The parent name and child name values are used to correctly place the string in the XML. If the string is for another language, then the only information that needs to be entered after specifying the language is the string ID and string name. For example, if the string is for French, then the ID and the French translated string is the necessary information. When the two values are entered, then the XML manager looks for the place to be inserted in XML by searching that ID in the English XML string table. If the ID is found then the string will be added to the French XML string table along with the string attributes. If there is already a string for that ID in the French XML string table, then the user will be prompted whether to overwrite or keep the old string. If the ID is not found in the English XML string table, then that ID will not be entered to the French XML string table.

Since the only necessary information for the localized languages are ID and string text, the user will be able to add multiple string at once instead of one at a time in English. This is more convenient and faster when adding strings for localized languages.

Edit feature 252 of the present invention may involve editing a string by entering a string ID, or editing a string by entering a string name. User will be able to modify the current strings used for the printer driver by providing a string ID or a string through a provided user interface. An editing the string enables the user to modify the actual string or the corresponding hotkey. When the string ID is entered in a search field after selecting a language, the XML manager searches a string for that ID. When the string name is entered in a search field, the XML manager displays all the matching strings. If the string is found, then the user will be able to modify the searched string.

There is an option to search only for an exact match or any partial match. If the option "exact match" is selected, then the matched string is updated to a new string. This method is useful when you only want to change one string to a different string. For example, if the searched string is "Paper", and the new string to be added is "Paper Size", the string "Paper" will be overwritten to "Paper Size".

If the option "partial match" is selected, then the new string will overwrite the matched word in a string to a new string. For example, if the search string is "application", the new string to be added is "tool", and the returned strings are "application", "software application", and "printer application". Then the above strings will be overwritten to "tool", "software tool", and "printer tool". This method is useful when all of the specific term used in the printer driver needs to be changed, and that change needs to be consistent throughout the driver dialogs.

The Remove feature 253 of the present invention may involve removing a string by entering a string ID, or removing a string by entering a string name. User will be able to delete a string from the string table by entering string ID or string name for the string to be removed. Searching by ID enables the user to remove only the string with a matched ID. For example, if the search ID is "6100", and there is a match, then the string for that ID will be removed. Searching by string name enables the user to search for a string without knowing the string ID.

The XML structure of the English needs to have more structures than any other languages, since it is a base language of all supported languages. If the string for a selected language to be removed is English, then the string in the localized languages may have to be automatically removed as well. If the selected language is other than English, then the English XML structure is not affected, only the string and the XML structure for that string in the selected language is removed.

A specified string for multiple localized languages can be removed at once. For example, if the selected ID is "6100"

and the selected languages are French, Spanish, and German, then the string for ID "6100" are removed for all the selected localized languages. This method only applies if the string ID is used in a search criterion.

When the string name is entered in a search criterion, only one language can be selected. There is an option to return the exact match or partial match of the string. If the exact match is selected and there are multiple IDs with the same string, then the user will be able to choose which ones to remove. If the partial match is selected, then all of the strings containing a searched word are returned. Here, the user will be able to select which strings to remove. When removing a string that contains a searched word, the whole string will be removed instead of just a search word in a string.

Three patters of operation for Edit and Remove features may be summarized as follows. For an input of string ID, selection is exact, and the output is one string. For an input of string name, selection is exact, and the output is one string, or multiple strings. For an input of string name, selection is partial, and the output is one string, or multiple strings.

The Search features 254 of the present invention may involve searching by entering a string ID, searching by entering a string name, searching a translation of a certain string, searching for a missing translation, and displaying all strings used in a certain language.

A search function can be used to search and display a particular string by entering a string ID or a string name. It is useful when you want to know if the certain string ID is already used before creating a new string ID, or just to lookup a string ID of a certain string by a string name. A search function can also be used to check for a translation of a particular word. In addition, it can be used to search for a missing translation as well. If the user wants to see all the string of a selected language, then selecting "All" will display all the string used in a language.

The search function returns a string ID, string name, corresponding hotkey, and its location of the string used in the printer driver's graphical user interface. The user will be able to search a string for one language or for all languages with the same string ID.

When searching by string ID, the user will be able to select which languages to search for. The selection can be one language or can have multiple languages. For example, if the string ID is "100" and English is the only language selected then it will display the string, the corresponding hotkey, and the location of the string used for English language. If English, German, and French are selected, then it will display the string, the corresponding hotkeys, and the location of the string used for all three languages.

Additionally, the search by string ID can be used for checking translation of the searched string. For example, if the searched string ID is "120" and English, Italian, and Spanish is selected in the language selection, then the user will be able to check the translated string of string ID "120" for Italian and Spanish. (For sting ID 120, the English string is "Page"; the Italian string is "Pagina"; and the Spanish string is "Pagina".)

When searching string by a string name, the user will only be able to choose one language. The additional option for searching by string is the selection to search for exact match or partial match of the word. If the search for exact match is selected, then only the complete match of the searched string will be displayed. If there is more than one result, then all the matched strings will be displayed. If the search for partial match is selected, then all the strings containing the searched string will be displayed.

The user will be able to search for a missing translation in a selected language. The method for finding a missing string will be to compare the string table of the selected language to the English string table. For example, if the user wants to know which strings are not translated in the Portuguese language, the search function can display all the strings which are not in Portuguese string table but in English string table. This list can be useful when you need to know which strings need to be sent to a translation.

There is a case when the user wants to see all the strings in a string table. By selecting "All", the search function will return all the string of the selected language. The displayed list of string will be in the order of string ID. When selecting the option "All", the user will able to choose which information to display along with the string ID. This additional information is the string name, corresponding hotkey, and the location of the string in the user dialog.

This application is typically web based. It is accessible from any graphical web browsers. An administrator or engineer who manages the strings for printer driver will be able to use the following features: Add new string to the string table; Edit the string in the string table; Remove the string from the string table; and Search the string in the string table.

A regular user will be able to use this application but feature is limited to searching the strings to test and verify user interface of the driver.

When the string table is modified, it will be copied and synchronized to the server. After the modification, the regular user will be able to browse the newly added or modified string tables for testing localization. The advantage of providing a network access to the string table is that the engineers as well as QA engineers can access the latest string table by accessing the application through a web browser. Since it is available though a network, the management of the string table can be done onsite or offsite. Each features of this application can be used from graphical user interface provided by the application.

Figure 3:
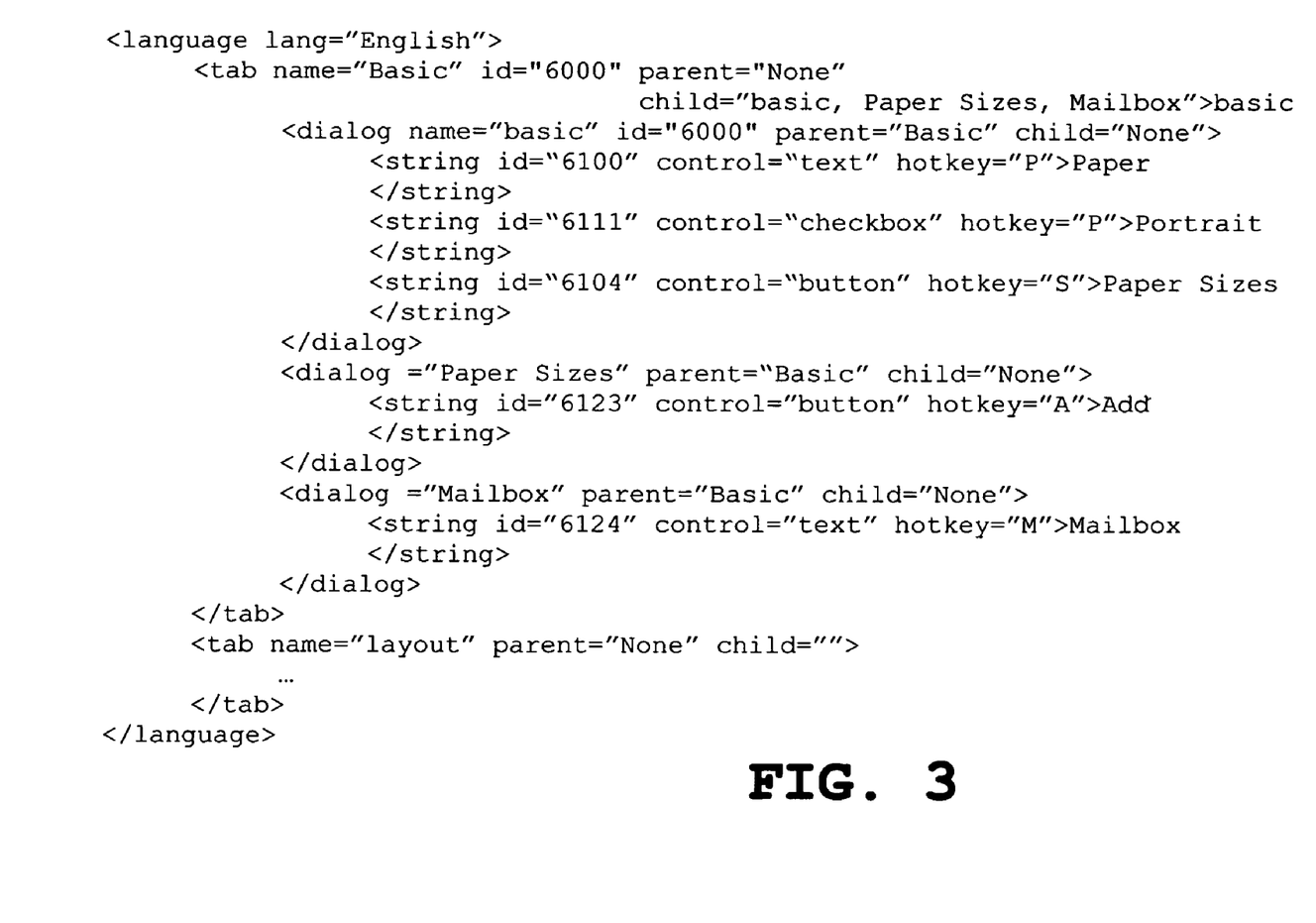
FIG. 3 is a sample XML string table format, in accordance with a preferred embodiment of the present invention.

FIG. 3 is a sample XML string table format, in accordance with a preferred embodiment of the present invention. In a preferred embodiment of the present invention, strings used for printer driver are kept in XML format. Following shows an example of XML formatted string table.

In the example, the top-most element is <language>. In an embodiment, there is going to be one language per one file. For example, all of the strings contained in a file will only be used for the language specified in the <language> element. The child of the <language> is <tab> element. In a prototype of the invention, currently there are total of 8 different tabs. The children of the tab elements are controls in that dialog and secondary dialogs. In the example, the <dialog> element is the child of <tab> element, and the <string> element is the child of <dialog> element.

The <language> element contains one attribute "lang". It tells what language the string is for. The <tab> element contains "name", "id", "parent", and "child" attributes. The "name" attribute describes the name of the tab. The "id" attribute is the unique id number for the string "basic". The "parent" attributes tells if there is any parent window. The "child" element tells if there is any child window.

The attributes in <dialog> element contains the names of its parent and child window. It describes the general location of the specific dialog. The "parent" attribute describes what the parent window is and the "child" attribute describes if there is any child window for that dialog.

The <string> element contains "control" and "hotkey" attributes. The "control" attribute describes if the string is used for a static text, edit box, combo box, button, checkbox, radio button, list, etc. The "hotkey" attribute describes which letter is used as a hotkey for a specified string.

If the "parent" or "child" attributes contains the word "None", then that means that there is no parent window or child window for that element.

Figure 4:
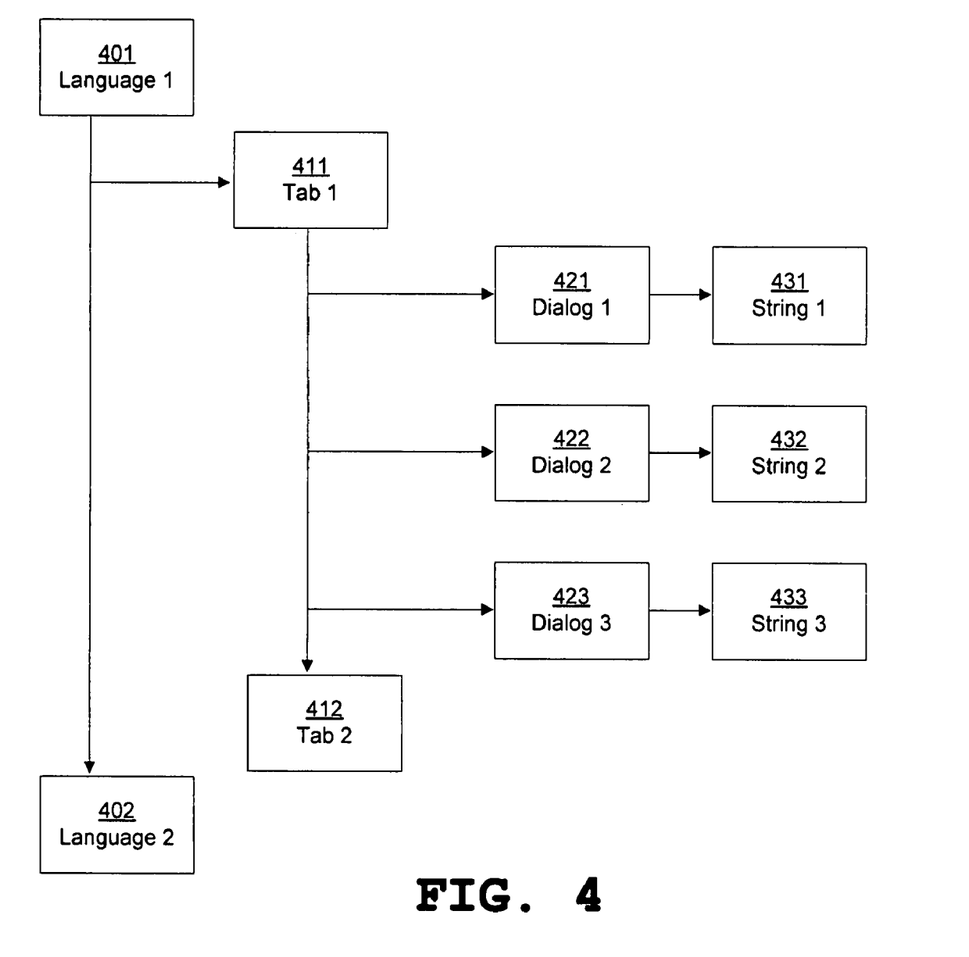
FIG. 4 is a block diagram showing the hierarchy of levels in a XML string table, in accordance with a preferred embodiment of the present invention.

FIG. 4 is a block diagram showing the hierarchy of levels in a XML string table, in accordance with a preferred embodiment of the present invention.

In the example, the top-most element is <language>. The two specified languages are "Language 1" 401, and the "Language 2" 402. The child of the <language> is <tab> element, corresponding to each tab in a UI dialog menu. The two specified languages are "Tab 1" 411, and the "Tab 2" 412.

The children of the tab elements are controls in that dialog and secondary dialogs, each of which is a portion within a UI tab. In the example, the <dialog> element is the child of <tab> element, and the <string> element is the child of <dialog> element. Tab1 411 contains three dialogs 421, 422, 423, each of which contains a string 431, 432, 433. A dialog may contain several strings.

Figure 5:
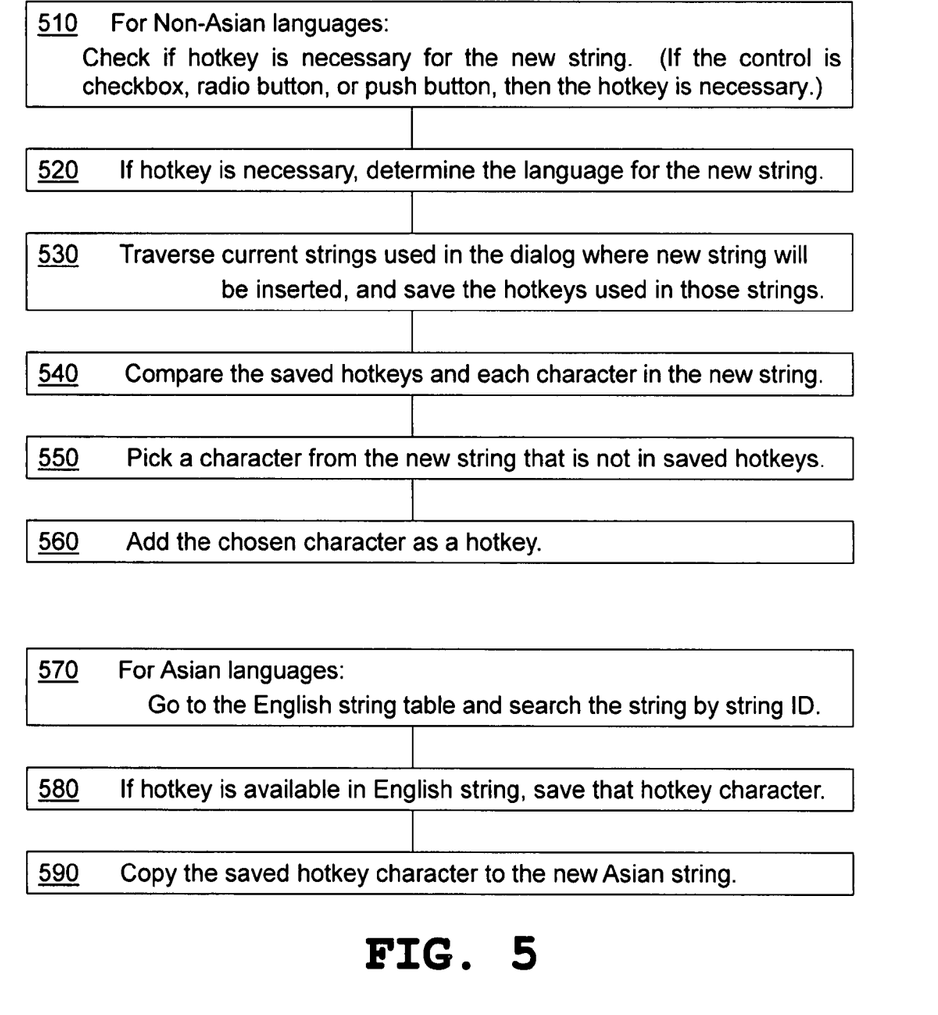
FIG. 5 is a flowchart showing automatic determination and registration of hotkey for a new UI string, in accordance with a preferred embodiment of the present invention.

FIG. 5 is a flowchart showing automatic determination and registration of hotkey for a new UI string, in accordance with a preferred embodiment of the present invention.

XML string table is maintained in a way so that automatic hotkey insertion is possible for all languages. In addition to automatic hotkey insertion, a hotkey can be inserted manually by the user. Each string in XML string table is grouped into a dialog, so that the hotkey generator will be able to find a unique hotkey character not used within that dialog. For Asian languages, all the hotkeys will be inserted based on the hotkeys on English characters. For other languages, a unique hotkey character will be chosen within that dialog.

This feature works in conjunction with the Add and Edit features. The following is the algorithm use in the hotkey generator for both Non-Asian and Asian languages.

For non-Asian languages, in step 510, a check is made if hotkey is necessary for the new string. If the control is checkbox, radio button, or push button, then the hotkey is necessary. If hotkey is necessary, then step 520 checks which language the new string is for. Step 530 traverses the current strings used in the dialog where new string will be inserted and save the hotkeys used in those strings. Step 540 compares the list of saved hotkeys and each of the characters in the new string. Step 550 picks a character from the new string that is not in the list of saved hotkeys. Then, step 560 adds the chosen character as a hotkey.

For Asian languages, step 570 moves control and attention to the English string table and search the string by string ID. Then in step 580, if hotkey is available in English string, then save that hotkey character. Step 590 copies the saved hotkey character to the new Asian string.

The use of String XML Manager can greatly enhance the localization process. Instead of manually managing strings of all the supported languages in a text file locally, the XML formatted string table enables the management through network and with an access privileges using the graphical user interface to keep the unwanted modification of the string tables. The network managed string table makes any engineer working on localization to access the latest string tables faster by eliminating the need to send, receive and requesting string table each time to the engineer who modified the string tables.

The provided feature of adding, editing, removing, and searching strings using a graphical user interface makes the string manipulations easier without knowing the structure of XML formatted string table. The automatic hotkey insertion can greatly reduce the time to insert the hotkey to a string for any language, in contrast to the original method of adding a hotkey manually by looking alternately at the printer dialog and finding a unique character not used in any string within a dialog.

Although this invention has been largely described using terminology pertaining to printer drivers, one skilled in this art could see how the disclosed methods can be used with other device drivers. The foregoing descriptions used printer drivers rather than general device drivers for concreteness of the explanations, but they also apply to other device drivers. Similarly, the foregoing descriptions of the preferred embodiments generally use examples pertaining to printer driver settings, but they are to be understood as similarly applicable to other kinds of device drivers.

Although the terminology and description of this invention may seem to have assumed a certain platform, one skilled in this art could see how the disclosed methods can be used with other operating systems, such as Windows, DOS, Unix, Linux, Palm OS, or Apple OS, and in a variety of devices, including personal computers, network appliance, handheld computer, personal digital assistant, handheld and multimedia devices, etc. One skilled in this art could also see how the user could be provided with more choices, or how the invention could be automated to make one or more of the steps in the methods of the invention invisible to the end user.

While this invention has been described in conjunction with its specific embodiments, it is evident that many alternatives, modifications and variations will be apparent to those skilled in the art. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A method for providing a user interface (UI) string table management computer system for developing a UI string table for device user interface by a localization team comprising at least one administrator and at least one read-only user (ROU), comprising computer-executed method steps of:

providing a user interface (UI) string table management computer system for developing a UI string table by a localization team comprising at least one administrator and at least one read-only user (ROU), which UI string table management computer system allows each member of the localization team to access a UI string table;

placing the UI string table at a string table management unit, which UI string table comprises a plurality of a string identification number paired with a string;

the at least one administrator editing the UI string table through an administrator interface of the UI string table management computer system; and the at least one read-only user (ROU) accessing the UI string table through a ROU interface of the UI string table management computer system, wherein the at least one read-only user (ROU)'s access to the UI string table is controlled by an Access Control unit, which access is restricted to reading and searching the UI string table, the Access Control unit ensures shared access by both the at least one administrator and the at least one read-only user (ROU), and the UI string table management computer system presents to the localization team a UI based on the current UI string table for the purpose of localization development process; and after localization process, a device user interface is presented to an end-user by displaying a string in the device user interface by using the string identification number, wherein the editing of the UI string table through the UI string table management computer system further comprises enabling the at least one administrator to insert a hotkey associated with a new UI string if necessary, where a hotkey is necessary for new UI strings corresponding to checkboxes, radio buttons, and push buttons, and wherein the inserting a hotkey associated with the new UI string comprises:

for the language of the new UI string, traversing the current UI strings used in the dialog where new UI string will be inserted and saving the hotkeys used in those strings;

comparing, using a microprocessor, the list of saved hotkeys and each of the characters in the new UI string;

picking a character from the new UI string that is not in the list of saved hotkeys; and adding the chosen character as a hotkey.

2. The method of claim 1, wherein the UI string table is hierarchically formatted to enable organization into at least one top level, having at least one tab child level, optionally having at least one dialog child level, containing at least one UI string, and wherein the at least one top level comprises at least one language level that specifies the language of the at least one UI string.

3. The method of claim 1, wherein the UI string table is XML formatted optionally with an identification number for each node.

4. The method of claim 1, wherein the editing of the UI string table through a UI string table management computer system comprises: adding a new string to the UI string table; editing an existing string in the UI string table; removing an existing string from the UI string table; and searching within the UI string table.

5. The method of claim 1, wherein the inserting a hotkey associated with the new UI string comprises:

for the new UI string in an Asian language, going to the English string table within the UI string table and searching the string by string ID to find the English UI string corresponding to the new UI string in the Asian language; and if a hotkey is available in English UI string, then saving that hotkey character, and then copying the saved hotkey character to be associated with the new UI string in the Asian language.

6. The method of claim 1, wherein the string table management unit is a remote server, and upon editing of a local copy of the UI string table at a client, the changes are copied and synchronized to the UI string table at the remote server.

7. A computing system for providing a user interface (UI) string table management computer system for developing a UI string table for device user interface by a localization team comprising at least one administrator and at least one read-only user (ROU), comprising:

providing a user interface (UI) string table management computer system for developing a UI string table by a localization team comprising at least one administrator and at least one read-only user (ROU), which UI string table management computer system allows each member of the localization team to access a UI string table;

placing the UI string table at a string table management unit, which UI string table comprises a plurality of a string identification number paired with a string;

the at least one administrator editing the UI string table through an administrator interface of the UI string table management computer system; and the at least one read-only user (ROU) accessing the UI string table through a ROU interface of the UI string table management computer system, wherein the at least one read-only user (ROU)'s access to the UI string table is controlled by an Access Control unit, which access is restricted to reading and searching the UI string table, the Access Control unit ensures shared access by both the at least one administrator and the at least one read-only user (ROU), and the UI string table management computer system presents to the localization team a UI based on the current UI string table for the purpose of localization development process; and after localization process, a device user interface is presented to an end-user by displaying a string in the device user interface by using the string identification number, wherein the editing of the UI string table through the UI string table management computer system further comprises enabling the at least one administrator to insert a hotkey associated with a new UI string if necessary, where a hotkey is necessary for new UI strings corresponding to checkboxes, radio buttons, and push buttons, and wherein the inserting a hotkey associated with the new UI string comprises:

for the language of the new UI string, traversing the current UI strings used in the dialog where new UI string will be inserted and saving the hotkeys used in those strings;

comparing, using a microprocessor, the list of saved hotkeys and each of the characters in the new UI string;

picking a character from the new UI string that is not in the list of saved hotkeys; and adding the chosen character as a hotkey.

8. The computing system of claim 7, wherein the UI string table is XML formatted optionally with an identification number for each node, wherein the UI string table is hierarchically formatted to enable organization into at least one top level, having at least one tab child level, optionally having at least one dialog child level, containing at least one UI string, and wherein the at least one top level comprises at least one language level that specifies the language of the at least one UI string.

9. The computing system of claim 7, wherein the editing of the UI string table through a UI string table management computer system comprises: adding a new string to the UI string table; editing an existing string in the UI string table; removing an existing string from the UI string table; and searching within the UI string table.

10. The computing system of claim 7, wherein the inserting a hotkey associated with the new UI string comprises:

for the new UI string in an Asian language, going to the English string table within the UI string table and searching the string by string ID to find the English UI string corresponding to the new UI string in the Asian language; and if a hotkey is available in English UI string, then saving that hotkey character, and then copying the saved hotkey character to be associated with the new UI string in the Asian language.

11. The computing system of claim 7, wherein the string table management unit is a remote server, and upon editing of a local copy of the UI string table at a client, the changes are copied and synchronized to the UI string table at the remote server.

12. A computer program product in a non-transitory computer-readable storage medium for providing a user interface (UI) string table management system for developing a UI string table for device user interface by a localization team comprising at least one administrator and the at least one read-only user (ROU), comprising machine-readable code for causing a machine to perform the method steps of:

provide a user interface (UI) string table management computer system for developing a UI string table by a localization team comprising at least one administrator and at least one read-only user (ROU), which UI string table management computer system allows each member of the localization team to access a UI string table;

placing the UI string table at a string table management unit, which UI string table comprises a plurality of a string identification number paired with a string;

the at least one administrator editing the UI string table through an administrator interface of the UI string table management computer system; and the at least one read-only user (ROU) accessing the UI string table through a ROU interface of the UI string table management computer system, wherein the at least one read-only user (ROU)'s access to the UI string table is controlled by an Access Control unit, which access is restricted to reading and searching the UI string table, the Access Control unit ensures shared access by both the at least one administrator and the at least one read-only user (ROU), and the UI string table management computer system presents to the localization team a UI based on the current UI string table for the purpose of localization development process; and after localization process, a device user interface is presented to an end-user by displaying a string in the device user interface by using the string identification number, wherein the editing of the UI string table through the UI string table management computer system further comprises enabling the at least one administrator to insert a hotkey associated with a new UI string if necessary, where a hotkey is necessary for new UI strings corresponding to checkboxes, radio buttons, and push buttons, and wherein the inserting a hotkey associated with the new UI string comprises:

for the language of the new UI string, traversing the current UI strings used in the dialog where new UI string will be inserted and saving the hotkeys used in those strings;

comparing, using a microprocessor, the list of saved hotkeys and each of the characters in the new UI string;

picking a character from the new UI string that is not in the list of saved hotkeys; and adding the chosen character as a hotkey.

13. The computer program product of claim 12, wherein the UI string table is XML formatted optionally with an identification number for each node, wherein the UI string table is hierarchically formatted to enable organization into at least one top level, having at least one tab child level, optionally having at least one dialog child level, containing at least one UI string, and wherein the at least one top level comprises at least one language level that specifies the language of the at least one UI string.

14. The computer program product of claim 12, wherein the editing of the UI string table through a UI string table management computer system comprises: adding a new string to the UI string table; editing an existing string in the UI string table; removing an existing string from the UI string table; and searching within the UI string table.

15. The computer program product of claim 12, wherein the inserting a hotkey associated with the new UI string comprises:

for the new UI string in an Asian language, going to the English string table within the UI string table and searching the string by string ID to find the English UI string corresponding to the new UI string in the Asian language; and if a hotkey is available in English UI string, then saving that hotkey character, and then copying the saved hotkey character to be associated with the new UI string in the Asian language.

16. The computer program product of claim 12, wherein the string table management unit is a remote server, and upon editing of a local copy of the UI string table at a client, the changes are copied and synchronized to the UI string table at the remote server.

* * * * *